United States Patent
Hsu et al.

(10) Patent No.: US 7,933,597 B2
(45) Date of Patent: Apr. 26, 2011

(54) METHOD OF REGISTERING A NETWORK, AND MOBILE STATION AND COMMUNICATION SYSTEM USING THE SAME

(75) Inventors: Ying Hsu, Taipei (TW); Jui-Sheng Hung, Changhua County (TW)

(73) Assignee: Qisda Corporation, Taoyuan County (TW)

( * ) Notice: Subject to any disclaimer, the term of this patent is extended or adjusted under 35 U.S.C. 154(b) by 988 days.

(21) Appl. No.: 11/808,507

(22) Filed: Jun. 11, 2007

(65) Prior Publication Data

US 2007/0287455 A1 Dec. 13, 2007

(30) Foreign Application Priority Data

Jun. 12, 2006 (TW) .............................. 95120830 A

(51) Int. Cl.
*H04W 4/00* (2009.01)
(52) U.S. Cl. .................... 455/435.1; 455/435.2; 455/466
(58) Field of Classification Search ........................ None
See application file for complete search history.

(56) References Cited

U.S. PATENT DOCUMENTS

| | | | |
|---|---|---|---|
| 4,200,770 A | 4/1980 | Hellman et al. | |
| 7,418,596 B1 * | 8/2008 | Carroll et al. | 713/169 |
| 7,574,737 B1 * | 8/2009 | Loh | 726/15 |
| 2002/0009199 A1 | 1/2002 | Ala-Laurila et al. | |
| 2002/0184539 A1* | 12/2002 | Fukuda et al. | 713/202 |
| 2005/0058096 A1 | 3/2005 | Cheng | |
| 2005/0255876 A1 | 11/2005 | Huang et al. | |

FOREIGN PATENT DOCUMENTS

CN    1691822 A    11/2005

* cited by examiner

*Primary Examiner* — Erika A Gary

(57) ABSTRACT

A method of registering a network is applied to a mobile station. The mobile station has a first network module and a second network module. The first network module is for accessing a first network having a third network module. The second and third network modules are for accessing a wideband network. The method of registering the network includes the following steps. First, the second network module transmits an identification code to the third network module via the wideband network. Next, the first network stores the identification code. Finally, the first network notifies, via the first network module, the mobile station that registering succeeds.

36 Claims, 3 Drawing Sheets

METHOD OF REGISTERING A NETWORK, AND MOBILE STATION AND COMMUNICATION SYSTEM USING THE SAME

This application claims the benefit of Taiwan application Serial No. 95120830, filed Jun. 12, 2006, the subject matter of which is incorporated herein by reference.

BACKGROUND OF THE INVENTION

1. Field of the Invention

The invention relates in general to a method of registering a network, and a mobile station and a communication system using the same, and more particularly to a high-security method of registering a network, and a mobile station and a communication system using the same.

2. Description of the Related Art

U.S. Patent Publication No. 2002/0009199 discloses architecture and a method of registering a wireless local area network (WLAN). FIG. 1 (Prior Art) is a schematic illustration showing a conventional communication system 100. As shown in FIG. 1, a general packet radio service (GPRS) network 120 in the communication system 100 includes a base station (BS) 122, a radio access network (RAN) 124, a mobile switching center/home location recorder (MSC/HLR) 126 and a verification database 128. The mobile station (MS) 140 includes a WLAN network card and a subscriber identity module (SIM) card (not shown). The MS 140 registers the GPRS network 120 using the SIM card.

The MS 140 may also register a WLAN 160 using the SIM card. In FIG. 1, the MS 140 transfers an international mobile subscriber identity to an access point (AP) 162 in the form of packets using the SIM card. Then, the AP 162 transfers the international mobile subscriber identity to an access controller 164, which manages registering of the MS 140 and filters the packet transferred from the mobile station, which is not authenticated.

Then, the access controller 164 transfers the international mobile subscriber identity to the verification database 128 of the GPRS network 120 via an Internet protocol (IP) network 180. The verification database 128 obtains the authentication information via the MSC/HLR 126 to manage the registering requirements of the MS 140. When the verification database 128 obtains the authentication data of the MS 140 from the MSC/HLR 126, the verification database 128 transmits the authentication data to the access controller 164 via the IP network 180, and the access controller 164 notifies, via the AP 162, the MS 140 that the WLAN 160 has been successfully registered.

In the architecture of registering the WLAN, the authentication data has to be obtained through the remote MSC/HLR 126 and the verification database 128. So, when the MS 140 is registering the WLAN 160, the transmitted packets containing the international mobile subscriber identity have to be transmitted to the MSC/HLR 126 via the IP network 180 and the verification database 128, and the authentication data has to be transmitted back to the access controller 164 reversely via the same transmitting path. Consequently, the packet transmitting not only reduces the overall efficiency of the network but also increases the end-to-end delay when the mobile station and the mobile station are communicating with each other. In addition, the IP network 180 is an open network, and the packet, which contains the international mobile subscriber identity and is not encrypted, may be stolen when the IP network 180 is transmitting data, thereby reducing the security of the data transmission significantly.

SUMMARY OF THE INVENTION

The invention is directed to a method of registering a network, and a mobile station and a communication system using the same, wherein the mobile station can register the WLAN in a safe and rapid manner using a short message service provided by the wideband network.

According to a first aspect of the present invention, a method for a mobile station to register a first network is provided. The mobile station has a first network module and a second network module. The first network module is for accessing a first network. The first network has a third network module. The second network module and the third network module are for accessing a wideband network. The method includes the following steps. First, the second network module transmits an identification code (MACa) to the third network module via the wideband network. Next, the first network stores the identification code. Finally, the first network notifies, via the first network module, the mobile station that registering succeeds.

According to a second aspect of the present invention, a mobile station that may be linked to a wideband network and an Intranet is provided. The Intranet has a wideband network module. The mobile station includes a first network module, a second network module, a memory and a control unit. The first network module is for accessing the Intranet. The second network module is for accessing the wideband network. The memory stores an identification code. The control unit enables the second network module to transmit the identification code to the wideband network module via the wideband network, and the Intranet notifies, via the first network module, the mobile station that registering succeeds.

According to a third aspect of the present invention, a communication system is provided. The communication system includes an Intranet, a wideband network and a mobile station. The Intranet has a wideband network module. The mobile station has an identification code and includes a first network module and a second network module. The first network module is for accessing the Intranet. The second network module is for accessing the wideband network. The mobile station transmits the identification code to the Intranet via the wideband network module, and the Intranet notifies, via the first network module, the mobile station that registering succeeds.

The invention will become apparent from the following detailed description of the preferred but non-limiting embodiments. The following description is made with reference to the accompanying drawings.

DETAILED DESCRIPTION OF THE INVENTION

The invention provides a method of registering a network, and a mobile station and a communication system using the same, wherein an identification code (MACa) and an encrypted identification code (EMsg) are transmitted to an verification database to get the authentication using a short message service (SMS) provided by a wideband network, such as a GSM network, a WCDMA network or a CDMA2000 network, so that the mobile station can register the Intranet in a safe and rapid manner.

Figure 1:
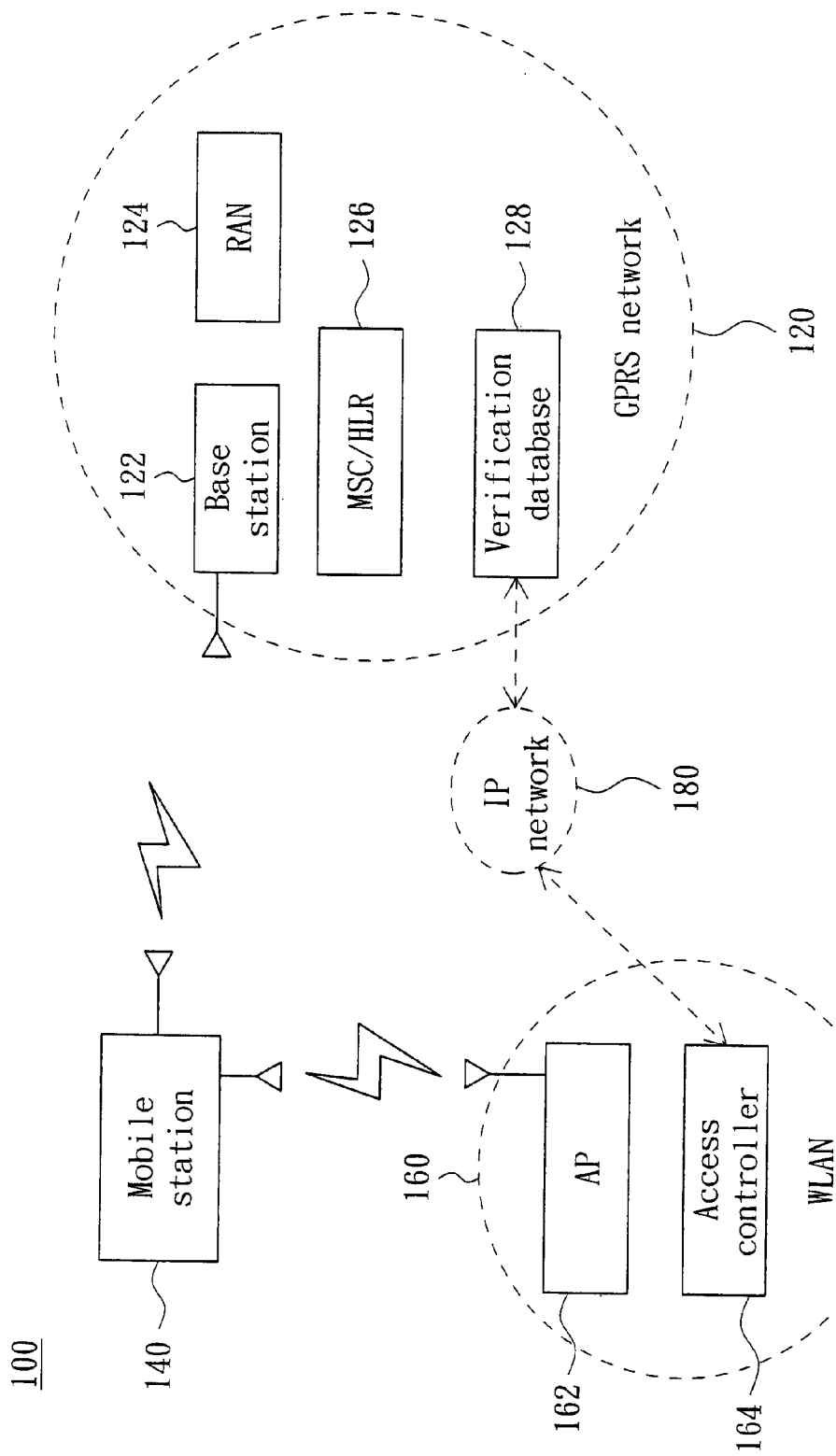
FIG. 1 (Prior Art) is a schematic illustration showing a conventional communication system.
Figure 2:
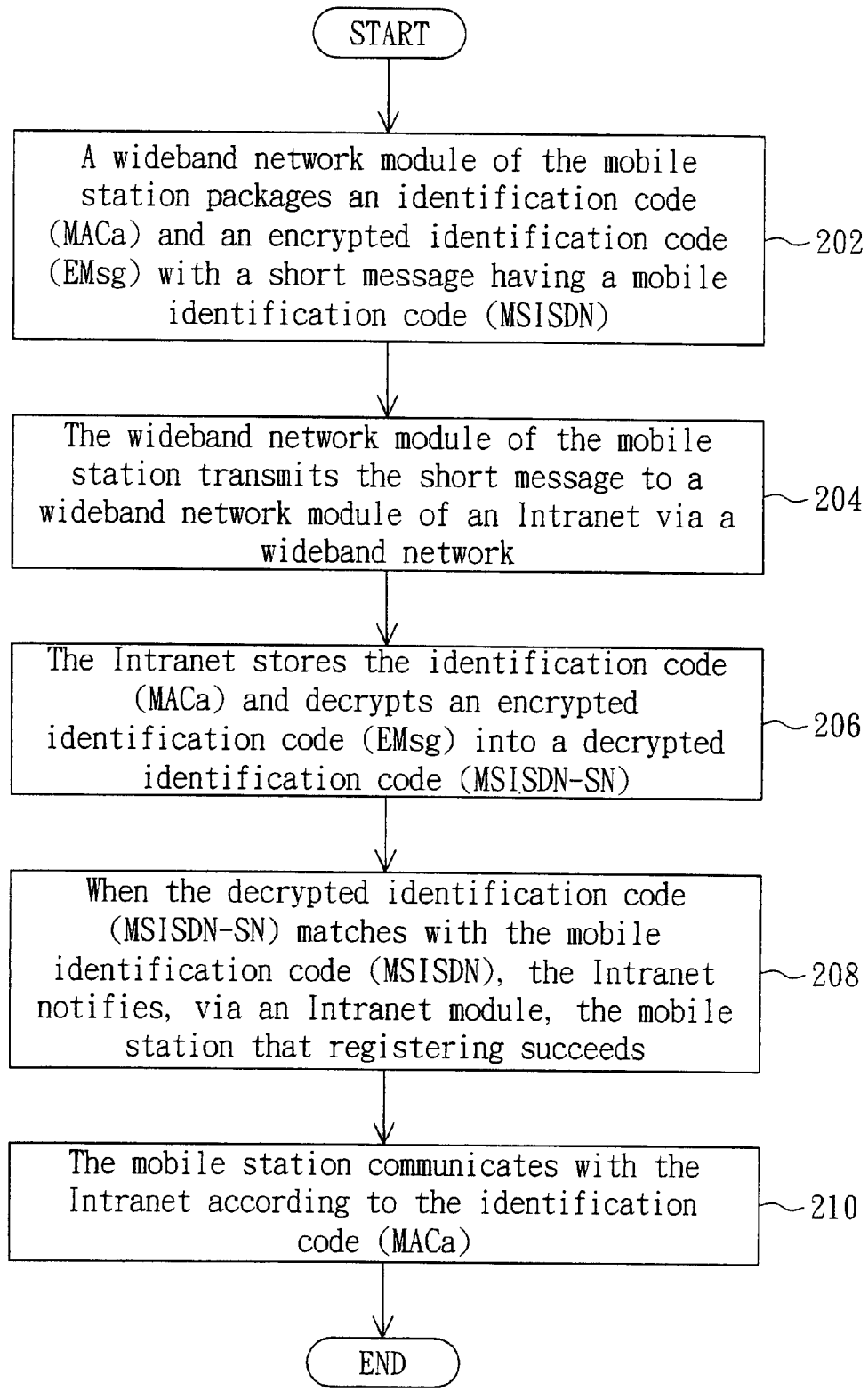
FIG. 2 is a flow chart showing a method of registering a network according to a preferred embodiment of the invention.

FIG. 2 is a flow chart showing a method of registering a network according to a preferred embodiment of the invention. As shown in FIG. 2, the method of the invention is applied to a mobile station, which has a mobile identification code (MSISDN), and is a dual-mode mobile telephone having an Intranet module and a wideband network module. The Intranet module is for accessing an Intranet. The Intranet has another wideband network module. The two wideband modules are for accessing a wideband network, which may be a GSM network, a WCDMA network or a CDMA2000 network.

First, in step 202, the wideband network module of the mobile station packages the identification code (MACa) and an encrypted identification code (EMsg) with a short message and transmits the short message containing the mobile identification code (MSISDN). Next, in step 204, the wideband network module of the mobile station transmits the short message to the wideband network module of the Intranet via the wideband network. Then, in step 206, the Intranet stores the identification code (MACa) and decrypts the encrypted identification code (EMsg) into a decrypted identification code (MSISDN-SN). Next, in step 208, when the decrypted identification code (MSISDN-SN) matches with the mobile identification code (MSISDN), the Intranet notifies, via the Intranet module, the mobile station that registering succeeds. Finally, in step 210, the mobile station communicates with the Intranet according to the identification code (MACa).

Figure 3:
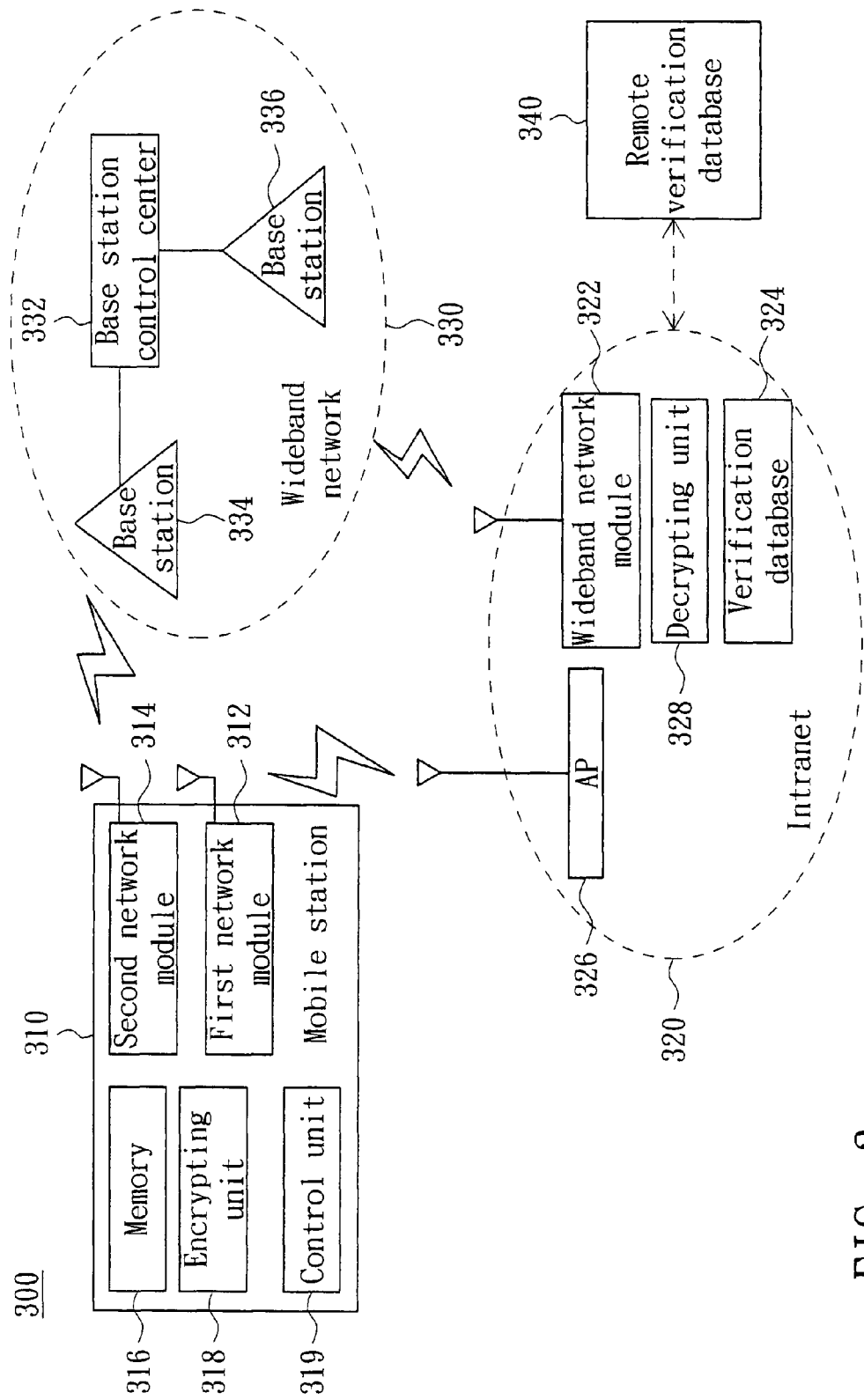
FIG. 3 is a schematic illustration showing a communication system according to the preferred embodiment of the invention.

In order to disclose the technological features contained in the method of the invention of registering the network in a more detailed manner, descriptions will be made by taking the overall communication system as an example. FIG. 3 is a schematic illustration showing a communication system according to the preferred embodiment of the invention. Referring to FIG. 3, a communication system 300 includes a mobile station 310, an Intranet 320 and a wideband network 330. The Intranet 320 has a wideband network module 322. The mobile station 310 has the identification code (MACa) and includes a first network module 312 and a second network module 314. The first network module 312 is for accessing the Intranet 320, and the second network module 314 is for accessing the wideband network 330. The mobile station 310 transmits the identification code (MACa) to the Intranet 320 via the wideband network module 322, and the Intranet 320 notifies, via first network module 312, the mobile station 310 that the registering succeeds.

The mobile station 310 further includes a memory 316, an encrypting unit 318 and a control unit 319. The Intranet 320 further includes a verification database 324, a fourth network module, such as an AP 326, and a decrypting unit 328. The AP 326 and the first network module 312 are Intranet modules. The wideband network 330 includes a base station control center (MSC) 332, a base station 334 and a base station 336. The wideband network 330 may be, for example, a GSM network, a WCDMA network or a CDMA2000 network.

The memory 316 in the mobile station 310 stores the identification code (MACa) and the mobile identification code (MSISDN). The encrypting unit 318 encrypts the mobile identification code (MSISDN) into an encrypted identification code (EMsg) according to a predetermined encrypting method. The second network module 314 transmits the identification code (MACa) and the encrypted identification code (EMsg) to the wideband network module 322 and thus to the Intranet 320 via wideband network 330. The decrypting unit 328 in the Intranet 320 decrypts the encrypted identification code (EMsg) into a decrypted identification code (MSISDN-SN) according to a predetermined decrypting method. When the decrypted identification code (MSISDN-SN) matches with the mobile identification code (MSISDN), the Intranet 320 notifies, via the first network module 312, the mobile station 310 that the registering succeeds.

First, an encoding key q and a constant $\alpha$ are stored to the memory 316 and the verification database 324, wherein the encoding key q and the constant $\alpha$ are prime numbers, and the relationship between the encoding key q and the constant $\alpha$ is represented by Equation 1.

$$\alpha=(q-1)/2 \qquad \text{(Equation 1)}$$

Next, a first natural number Xa smaller than the encoding key q is set and assigned to the mobile station 310, which calculates a first code Ya, wherein the relationship between the first natural number Xa and the first code Ya is represented by Equation 2.

$$Ya=(\alpha \char`\^ Xa) \bmod q \qquad \text{(Equation 2)}$$

The mobile station 310 transmits the first code Ya to the AP 326 via the first network module 312. In this step, it is possible to obtain the identification code (MACa) of the mobile station 310. The AP again transmits the first code Ya and the identification code (MACa) to the verification database 324.

A second natural number Xb smaller than the encoding key q is set and assigned to the verification database 324, which calculates a second code Yb and transmits the second code Yb to the mobile station 310 via the AP 326, wherein the relationship between the second natural number Xb and the second code Yb is represented by Equation 3.

$$Yb=(\alpha \char`\^ Xb) \bmod q \qquad \text{(Equation 3)}$$

The verification database 324 and the mobile station 310 respectively generates an encrypting key Ka according to the first code Ya, the second code Yb and the encoding key q, and the equation of the mobile station 310 for calculating the encrypting key Ka is represented by Equation 4.

$$Ka=(Yb \char`\^ Xa) \bmod q \qquad \text{(Equation 4)}$$

The equation of the verification database 324 for calculating the encrypting key Ka is represented by Equation 5.

$$Ka=(Ya \char`\^ Xb) \bmod q \qquad \text{(Equation 5)}$$

The verification database 324 correspondingly stores the encrypting key Ka and the identification code (MACa) into a remote verification database 340 with the identification code (MACa) of the mobile station 310 previously transmitted from the first network module 312 serving as an index, and the mobile station 310 also stores the encrypting key Ka.

Then, the mobile station 310 encrypts the mobile identification code (MSISDN) into the encrypted identification code (EMsg) according to the encrypting key Ka stored in the mobile station 310 using the predetermined encrypting method, such as the AES encrypting method with 128 bits. Thereafter, the mobile station 310 packages the identification code (MACa) and the encrypted identification code (EMsg) with a short message (SM) using the second network module 314, and transmits the short message to the wideband network module 322 in the Intranet 320 via the base station 334, the base station control center 332 and the base station 336 in the wideband network 330. The short message has the mobile identification code (MSISDN).

The verification database 324 finds the encrypting key Ka from the remote verification database 340 with the identification code (MACa) transmitted from the second network module 314 serving as an index. Then, the decrypting unit 328 decrypts the encrypted identification code (EMsg) into the decrypted identification code (MSISDN-SN) according to the encrypting key Ka using the predetermined decrypting method. When the verification database 324 judges that the decrypted identification code (MSISDN-SN) matches with the mobile identification code (MSISDN), it represents that the authentication succeeds, and the Intranet 320 notifies, via the first network module 312, the mobile station 310 that the registering succeeds. Meanwhile, the identification code (MACa) is recorded in the AP 326. Finally, the mobile station communicates with the Intranet 320 according to the identification code (MACa).

In the embodiment mentioned hereinabove, information is transmitted between the AP 326 and the verification database 324 via the Intranet 320, which may be a confidential network or a non-confidential network, such as the Internet. The information transmitted therebetween may be open. In addition, the encrypting keys Ka are individually obtained by performing calculations in the mobile station 310 and the verification database 324. So, if the information transmitted between the AP 326 and the verification database 324 is stolen or modified, only the authentication fails. The overall authentication mechanism of registering the network according to the embodiment of the invention cannot be cracked and can prevent the hacker from registering the Intranet 320, thereby enhancing the security of data transmission. In addition, the identification code (MACa) and the encrypted identification code (EMsg) are transmitted from the mobile station 310 to the verification database 324 through the short message service provided by the wideband network 330 in the form of the short message in this embodiment, but are not transmitted via the Intranet 320 in the form of the packet. So, the overall efficiency of the Intranet 320 will not be reduced, and the registering speed is increased.

In the method of registering the network, and the mobile station and the communication system using the same according to the embodiment of the invention, the identification code (MACa) and the encrypted identification code (EMsg) are transmitted to the verification database 324 in the form of the short message using the wideband network 330, and the encrypted identification code (EMsg) is decrypted into the decrypted identification code (MSISDN-SN) and whether the decrypted identification code (MSISDN-SN) matches with the mobile identification code (MSISDN) is judged so as to determine whether the mobile station 310 gets the authentication. Thus, the mobile station 310 can register the Intranet 320 in a safe and rapid manner.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for a mobile station to register a first network, the mobile station having a first wireless network module and a second wireless network module, the first network having a third wireless network module, the first wireless network module for accessing the first network, the second wireless network module and the third wireless network module for accessing a second network, the second network being a wideband network, the method comprising the steps of:

transmitting an identification code of the mobile station from the second wireless network module to the third wireless network module via the wideband network;

storing the mobile station identification code in the first network; and notifying the mobile station, by the first network, that registering succeeds via the first wireless network module.

2. The method according to claim 1, the mobile station having a mobile identification code, the method further comprising:

encrypting the mobile identification code into an encrypted identification code according to a predetermined encrypting method;

by the second wireless network module transmitting the mobile station identification code and the encrypted identification code to the third wireless network module via the wideband network;

by the first network, decrypting the encrypted identification code into a decrypted identification code according to a predetermined decrypting method; and enabling the first network to notify, via the first wireless network module, the mobile station that the registering succeeds when the decrypted identification code matches with the mobile identification code.

3. The method according to claim 2, further comprising:

enabling the second wireless network module to package the mobile station identification code and the encrypted identification code with a short message; and transmitting the short message having the mobile identification code to the third wireless network module.

4. The method according to claim 2, wherein the first network further comprises a verification database and the method further comprises the steps of:

respectively storing an encoding key (q) and a constant (a) in the verification database and the mobile station;

enabling the mobile station to generate a first code (Ya) according to the encoding key and the constant;

enabling the first wireless network module to transmit the first code and the mobile station identification code to the verification database;

enabling the verification database to generate a second code (Yb) according to the encoding key and the constant;

enabling the verification database to transmit the second code to the mobile station;

enabling the verification database and the mobile station to generate an encrypting key (Ka) according to the first code, the second code and the encoding key;

enabling the verification database to correspondingly store the encrypting key and the mobile station identification code transmitted from the first wireless network module; and enabling the mobile station to store the encrypting key.

5. The method according to claim 4, wherein the encoding key and the constant are prime numbers, the constant equals one half of a difference between the encoding key and 1, and the method further comprises the steps of:

setting and assigning a first natural number, which is smaller than the encoding key, to the mobile station, wherein the mobile station calculates the first code and transmits the first code and the mobile station identification code to the verification database, and the first code is a remainder obtained by dividing the constant to the power of the first natural number by the encoding key;

setting and assigning a second natural number, which is smaller than the encoding key, to the verification database, wherein the verification database calculates the second code and transmits the second code to the mobile station, and the second code is a remainder obtained by dividing the constant to the power of the second natural number by the encoding key;

enabling the verification database to calculate the encrypting key, which is a remainder obtained by dividing the first code to the power of the second natural number by the encoding key; and enabling the mobile station to calculate the encrypting key, which is a remainder obtained by dividing the second code to the power of the first natural number by the encoding key.

6. The method according to claim 4, wherein the predetermined encrypting method encrypts the mobile identification code into the encrypted identification code according to the encrypting key stored in the mobile station.

7. The method according to claim 4, wherein the predetermined decrypting method decrypts the encrypted identification code into the decrypted identification code according to the encrypting key stored in the verification database.

8. The method according to claim 7, wherein the verification database finds the encrypting key according to the mobile station identification code transmitted from the second wireless network module.

9. The method according to claim 1, further comprising the step of:

enabling the mobile station to communicate with the first network according to the mobile station identification code.

10. The method according to claim 1, wherein the first network further comprises a fourth network module, and the fourth network module and the first wireless network module are Intranet modules.

11. The method according to claim 1, wherein the wideband network is a GSM network, a WCDMA network or a CDMA2000 network.

12. A mobile station, which may be linked to a wideband network and an Intranet, the Intranet having a wideband network module, the mobile station comprising:

a first wireless network module for accessing the Intranet;
a second wireless network module for accessing the wideband network;
a memory for storing a mobile station identification code; and
a control unit for enabling the mobile station identification code to be transmitted from the second wireless network module to the wideband network module via the wideband network, and enabling the Intranet to notify the mobile station that registering succeeds via the first wireless network module.

13. The mobile station according to claim 12, wherein the memory further stores a mobile identification code, and the mobile station further comprises an encrypting unit for encrypting the mobile identification code into an encrypted identification code according to a predetermined encrypting method, wherein the second wireless network module transmits the mobile station identification code and the encrypted identification code to the wideband network module via the wideband network.

14. The mobile station according to claim 13, wherein the Intranet has a decrypting unit for decrypting the encrypted identification code into a decrypted identification code according to a predetermined decrypting method, wherein when the decrypted identification code matches with the mobile identification code, the Intranet notifies, via the first wireless network module, the mobile station that registering succeeds.

15. The mobile station according to claim 14, wherein the second wireless network module packages the mobile station identification code and the encrypted identification code with a short message, and transmits the short message to the wideband network module, and the short message has the mobile identification code.

16. The mobile station according to claim 14, wherein the Intranet further comprises a verification database, the mobile station generates a first code (Ya) according to a previously stored encoding key (q) and a previously stored constant (a), the first wireless network module transmits the first code and the mobile station identification code to the verification database, the verification database previously stores the encoding key and the constant and generates a second code (Yb), the verification database transmits the second code to the mobile station, the verification database and the mobile station respectively generate an encrypting key (Ka) according to the first code, the second code and the encoding key, the verification database correspondingly stores the encrypting key and the mobile station identification code transmitted from the first wireless network module, and the mobile station stores the encrypting key.

17. The mobile station according to claim 16, wherein the encoding key and the constant are prime numbers, the constant equals one half of a difference between the encoding key and 1.

18. The mobile station according to claim 17, wherein a first natural number smaller than the encoding key is set and assigned to the mobile station, the mobile station calculates the first code and transmits the first code and the mobile station identification code to the verification database, the first code is a remainder obtained by dividing the constant to the power of the first natural number by the encoding key, a second natural number smaller than the encoding key is set and assigned to the verification database, the verification database calculates the second code and transmits the second code to the mobile station, the second code is a remainder obtained by dividing the constant to the power of the second natural number by the encoding key, the verification database calculates the encrypting key, the encrypting key is a remainder obtained by dividing the first code to the power of the second natural number by the encoding key, the mobile station calculates the encrypting key, and the encrypting key is a remainder obtained by dividing the second code to the power of the first natural number by the encoding key.

19. The mobile station according to claim 16, wherein the predetermined encrypting method encrypts the mobile identification code into the encrypted identification code according to the encrypting key stored in the mobile station.

20. The mobile station according to claim 16, wherein the predetermined decrypting method decrypts the encrypted identification code into the decrypted identification code according to the encrypting key stored in the verification database.

21. The mobile station according to claim 20, wherein the verification database finds the encrypting key according to the mobile station identification code transmitted from the second wireless network module.

22. The mobile station according to claim 13, wherein the mobile station communicates with the Intranet according to the mobile station identification code.

23. The mobile station according to claim 13, wherein the Intranet further comprises a fourth network module, and the fourth network module and the first wireless network module are Intranet modules.

24. The mobile station according to claim 13, wherein the wideband network is a GSM network, a WCDMA network or a CDMA2000 network.

25. A communication system, comprising:
an Intranet having a wideband network module;
a wideband network; and
a mobile station having an identification code, the mobile station comprising:
  a first wireless network module for accessing the Intranet; and
  a second wireless network module for accessing the wideband network,
wherein the mobile station identification code is transmitted from the second wireless network module to the Intranet via the wideband network module, and the Intranet notifies the mobile station that registering succeeds via the first wireless network module.

26. The communication system according to claim 25, wherein the mobile station further comprises:
a memory for storing the mobile station identification code and a mobile identification code; and
an encrypting unit for encrypting the mobile identification code into an encrypted identification code according to a predetermined encrypting method, wherein the second wireless network module transmits the mobile station identification code and the encrypted identification code to the wideband network module and thus to the Intranet via the wideband network.

27. The communication system according to claim 26, wherein the Intranet further comprises a decrypting unit for decrypting the encrypted identification code into a decrypted identification code according to a predetermined decrypting method, wherein when the decrypted identification code matches with the mobile identification code, the Intranet notifies, via the first wireless network module, the mobile station that the registering succeeds.

28. The communication system according to claim 26, wherein the second wireless network module packages the mobile station identification code and the encrypted identification code with a short message, and transmits the short message to the wideband network module, and the short message has the mobile identification code.

29. The communication system according to claim 26, wherein the memory further stores an encoding key (q) and a constant (a), and the Intranet further comprises a verification database for storing the encoding key (q) and the constant ($\alpha$), wherein the mobile station generates a first code (Ya) according to the encoding key (q) and the constant ($\alpha$), the first wireless network module transmits the first code and the mobile station identification code to the verification database, the verification database generates a second code (Yb) according to the encoding key and the constant, the verification database transmits the second code to the mobile station, the verification database and the mobile station respectively generate an encrypting key (Ka) according to the first code, the second code and the encoding key, the verification database correspondingly stores the encrypting key and the mobile station identification code transmitted from the first wireless network module, and the mobile station stores the encrypting key.

30. The communication system according to claim 29, wherein the encoding key and the constant are prime numbers, the constant equals one half of a difference between the encoding key and 1.

31. The communication system according to claim 30, wherein a first natural number smaller than the encoding key is set and assigned to the mobile station, the mobile station calculates the first code and transmits the first code and the mobile station identification code to the verification database, the first code is a remainder obtained by dividing the constant to the power of the first natural number by the encoding key, a second natural number smaller than the encoding key is set and assigned to the verification database, the verification database calculates the second code and transmits the second code to the mobile station, the second code is a remainder obtained by dividing the constant to the power of the second natural number by the encoding key, the verification database calculates the encrypting key, the encrypting key is a remainder obtained by dividing the first code to the power of the second natural number by the encoding key, the mobile station calculates the encrypting key, and the encrypting key is a remainder obtained by dividing the second code to the power of the first natural number by the encoding key.

32. The communication system according to claim 29, wherein the predetermined encrypting method encrypts the mobile identification code into the encrypted identification code according to the encrypting key stored in the mobile station.

33. The communication system according to claim 29, wherein the predetermined decrypting method decrypts the encrypted identification code into the decrypted identification code according to the encrypting key stored in the verification database.

34. The communication system according to claim 33, wherein the verification database finds the encrypting key according to the mobile station identification code transmitted from the second wireless network module.

35. The communication system according to claim 25, wherein the mobile station communicates with the Intranet according to the mobile station identification code.

36. The communication system according to claim 25, wherein the Intranet further comprises a fourth network module, and the fourth network module and the first wireless network module are Intranet modules.

* * * * *